April 15, 1947.  S. MYERSON ET AL  2,419,084
DENTURE
Filed June 27, 1940
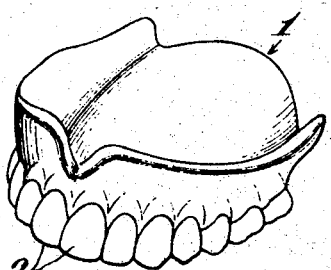
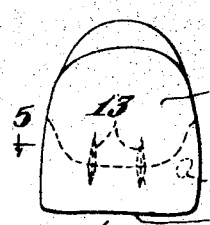
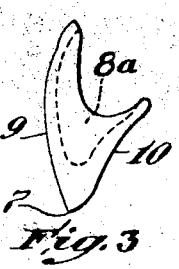
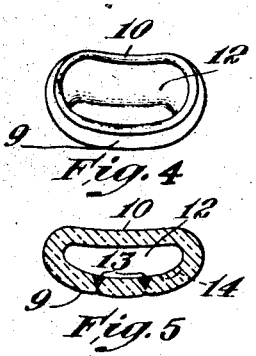
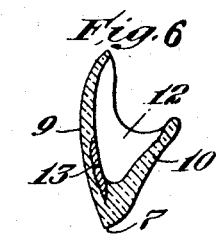
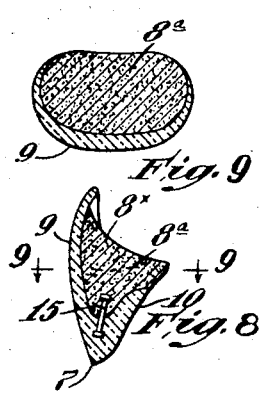
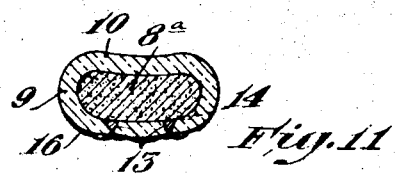
Inventors
Simon Myerson
Martin Myerson
by Roberts, Cushman & Woodbury
Att'ys.

Patented Apr. 15, 1947

2,419,084

UNITED STATES PATENT OFFICE 2,419,084

DENTURE

Simon Myerson and Martin Myerson, Brookline, Mass.

Application June 27, 1940, Serial No. 342,602

9 Claims. (Cl. 32—8)

This invention pertains to dentistry and relates more particularly to an improved denture and tooth for use therein.

Dentures as previously made usually comprise a support of a substantially rigid but mouldable material, for instance hard rubber or a synthetic resin in which is mounted one or more artificial teeth usually of ceramic material such as porcelain. The tooth is anchored to the unlike material of the support by some form of connecting element, for example a headed pin projecting from the tooth with its head embedded in the material of the support. Such attaching pins must be of a non-corrosive material, for instance gold, and are expensive to make and to put in place and at best provide but a small surface area for engagement by the substance of the support. Moreover, in order to provide a sufficient mass of material to insure firm anchorage of the heads of the pins, it is necessary to make the support thicker and heavier than is desirable. Furthermore, if the tooth of the usual prior denture is broken or loosened during use it is a matter of considerable difficulty to replace it.

The present invention has for one of its objects the provision of a denture, as an article of manufacture and sale, of a novel artificial tooth of such a character that it may be firmly and reliably anchored in place to a plate or other denture support; to provide a novel tooth which may thus be firmly anchored to a denture plate without resort to the use of pins or the like—specifically by integral or molecular union of an essential part of the tooth with the substance of the plate; to provide an artificial tooth comprising a part or parts of the same material as the support upon which the tooth will be mounted; to provide an artificial tooth having a dentine-simulating portion which is of a mouldable plastic material, for example, a synthetic resin; to provide a character such that the teeth are more firmly and reliably anchored in place than in most prior dentures; to provide a denture in which a broken tooth may readily be replaced without disturbing the other teeth or necessitating a reprocessing of the entire denture; to provide a denture in which the teeth are securely held in place, if desired, without resort to the use of pins or similar connecting means; to provide a denture in which a part of the tooth is integral with and of the same or similar material as the support; to provide a denture in which the support and the dentine-simulating portion of the tooth are integral and of a mouldable plastic material, for example, synthetic resin; to provide a tooth whose incisal or occlusal portions may be of a material substantially harder than the dentine-simulating portion so that the latter provides a cushion-like backing for the harder and possibly more brittle biting surfaces; to provide a tooth which consists of a dentine-simulating plug of relatively soft material for instance synthetic resin, and an outer enamel-simulating shell of a relatively harder material, for example porcelain; to provide a hollow tooth-crown or shell simulating in external contour and appearance the enamel of a natural tooth and which contains a gingivally exposed attaching plug of a relatively softer material to which the shell may be cemented; to provide a hollow tooth-crown or shell whose incisal portion is of light-transmitting material and which may have stria-simulating inserts in its labial wall; and to provide an artificial tooth having an enamel layer, for example of ceramic material overlain at its outer surface with a thin, irregular, hard and wear-resistant coating or film slightly more opaque than the enamel layer and which irregularly alters the light-reflecting character of the enamel.

Other and further objects and advantages of the invention will be pointed out hereinafter in the following more detailed description and by reference to the accompanying drawings in which Fig. 1 is a perspective view of a denture embodying the present invention;

Fig. 2 is a front elevation of the improved tooth of the present invention in its completed form and ready to be mounted in a denture;

Fig. 3 is a side elevation of the tooth of Fig. 2;

Fig. 4 is a top plan view of the wear-resistant shell constituting a portion of the tooth of Fig. 2;

Fig. 5 is a section of the shell of Fig. 4 substantially on the plane of the line 5—5 of Fig. 2;

Fig. 6 is a vertical section through the shell of Figs. 4 and 5;

Fig. 7 is a fragmentary vertical section to large scale of a denture having mounted therein a tooth embodying the present invention;

Fig. 8 is a vertical section through a tooth substantially like that shown in Fig. 7, the plate or support being omitted;

Fig. 9 is a section on the line 9—9 of Fig. 8;

Fig. 10 is a section generally similar to Fig. 7 but showing a further improvement; and Fig. 11 is a section on line 11—11 of Fig. 10.

Referring to the drawings the numeral 1 designates the supporting portion of a denture and the numeral 2 designates the teeth mounted in the support. As illustrated in Fig. 1, the denture is an upper plate, but it is to be understood that the invention is of broad application and useful in lower, as well as upper dentures, and that it is capable of use in dentures in which less than a full set of teeth are mounted, for example, even when the denture includes but a single tooth. It is further to be noted that while for convenience an upper denture is illustrated and such terms as "upper," "lower," "top," "bottom," etc., may be employed in the description, such terms are merely for convenience in description and not to be constructed in a limiting sense.

While an incisor is here illustrated, it is to be understood that all of the other teeth of the set may be made substantially as hereinafter described.

In accordance with the present invention, and in order that the tooth may have a durable wearing surface, the tooth is of a composite construction comprising a crown or shell (Figs. 4, 5 and 6) which may be of any desired material, for example porcelain, such shell providing the incisal edge 7 and also comprising the upwardly directed front or labial wall 9 and the upwardly directed rear or lingual wall 10 which merge at the sides of the tooth and which simulate the usual enamel portion of the tooth. Preferably the incisal portion of this shell or crown is of substantial depth below the lowermost point of the body portion of the tooth, so as to provide for the transmission of light through this lower part in accordance with the principles more fully described in the copending application of Simon Myerson, now Patent No. 2,300,305, dated October 27, 1942. This hollow crown or shell may be moulded in accordance with usual methods of making artificial teeth from ceramic materials, and as illustrated in Figs. 3 to 6, is provided with the chamber or socket 12 which is designed to receive the dentine-simulating body portion of the tooth. Preferably the lingual and labial walls at least of the chamber or socket 12 are deflected inwardly and diminished in thickness at the gingival end of the shell so that the outer surfaces of said walls are convexly curved at this end of the shell, the inwardly deflected portions of the wall being buried in the substance of the support when the tooth is mounted in the latter, thereby providing an extremely close joint between the shell and the support and a positive mechanical interlock of the shell and support. The dentine of a natural tooth is defined in Webster's New International Dictionary as "A calcareous material like bone but harder, which comprises the principal mass of a tooth." The same dictionary, under the definition of "tooth" remarks "A typical mammalian tooth consists of a root . . . and a variously shaped crown or projecting portion. . . . It is composed chiefly of dentine, surrounding a central pulp cavity . . . and coated with enamel on the crown." Funk & Wagnall's New Standard Dictionary defines dentine as "The hard, dense, calcified substance that forms the main portion of a tooth." If desired, and preferably, the forward or labial wall 9 of the shell or crown is provided with embedded inserts 13 (Figs. 2 and 5) of a material of different light-transmitting qualities from the enamel forming the shell, such inserts preferably extending forwardly from the inner surface of the shell toward its outer labial surface and being more or less wedge-shap or triangular in transverse section for the purpose of simulating stria or similar effects commonly occurring in natural teeth, all as more fully set forth in the patent to Simon Myerson, No. 2,202,713, dated May 28, 1940. The shell may also, if desired, be provided with inserts 14 of other shape and of irregular contour and located wherever desired, so as to simulate the more or less opaque and usually whitish spots sometimes occurring in natural teeth, all as more fully described in the patent to Simon Myerson, No. 2,202,712, dated May 28, 1940.

Different colors may be used representing characteristic dentine colors. Whether the enamel be of porcelain or not, it should be of a comparatively transparent hard material. The lingual aspect of the enamel may have inserts contrasting in visual effect from the enamel. Preferably these inserts extend outwardly to the labial face of the tooth.

While it is necessary only that the incisal and masticating areas of the tooth be hard enough to withstand the wear of mastication nevertheless it is preferable, in order to secure a perfect joint between the plate or denture support and the tooth, to make the part comprising the enamel portion of the tooth in the form of a cap or shell, thick incisally for anterior teeth and occlusively for posterior teeth. If that portion of the tooth representing the enamel is formed of a hard material which is thermoplastic it should also be of high curing temperature so as not to be melted or distorted when the denture is processed. If the enamel is formed of a hard material which is thermosetting it should be such as not to disintegrate when the denture is processed.

There are numerous advantages in the invention herein described. For years dentists have sought a practical crown type of tooth for dentures but while many such have been made, all have been limited in scope. In accordance with the present invention, the very thin margins at the gingival end of the shell permit easy grinding or in the case of plastics, filing, to fit the model. The retention is deep and is not interferred with. In this case it may be desirable to provide cement colors corresponding to the body colors.

While as illustrated in Fig. 6, the shell or crown comprises labial and lingual cusps 9 and 10, which extend up to the gingival portion of the tooth, it may in some instances be preferred to use a crown, shell or cap of smaller dimensions, such for example as merely to provide for the incisal edge and adjacent wear-receiving portions.

As herein illustrated (Fig. 7) the support comprises the plate portion 3 and the forward portion 4 which merge to form the gum-receiving channel 5, the forward portion 4 being of substantially the same thickness as the plate portion 3 and being contoured at its labial surface 4ª to form a smooth curve merging directly with the inner surface of the plate 3. After the shell or crown has been moulded from the ceramic or other material as above suggested, a plug 8ª, preferably of a material similar in characteristics to that which will form the support in which the tooth is to be mounted, is arranged so as to fill the cavity 12 in the shell. This plug (Figs. 7, 8 and 9) is cemented to the shell or crown and if additional anchorage be desired the shell may be furnished with a headed pin 15 (Fig. 8) which is embedded in the material of the plug or core 8ª, when the latter is filled into the space 12. This composite tooth, in which the outer portion, including the incisal edge, is of enamel, and the body portion or core which simulates the dentine of the tooth, is of a mouldable material ordinarily organic and, for example, a synthetic resin or the like, constitutes a complete article of manufacture and sale and is supplied by the manufacturer to the dentist or dental laboratory in all of the usual sizes, colors and shapes in which the usual porcelain teeth are made. When these composite teeth are to be mounted in a denture, they are assembled with the support forming material so that the upper surface $8^x$ of the plug or core $8^a$ (Fig. 8) contacts the curved surface $4^a$ of the support (Fig. 7) the part $8^a$ and the support then being molecularly united, preferably integrally, by some suitable treatment, for instance heat and pressure, whereby the adjacent surfaces $8^x$ and $4^a$ become firmly joined. The term "molecularly united" is here used to define the joinder of two elements by welding, interfusing, treatment with solvents or the like wherein the contacting surfaces of the two elements are integrated at the zone of union and the particles of such surfaces blend, intermingle and cohere to form an integral mass. However, these surfaces may be cemented together if they are of unlike material or if an integral union is too difficult to perform.

In Figs. 10 and 11 a further improvement is shown. In this instance the outer surface of the enamel simulating shell is provided with a very thin, preferably irregular, film or coating 16, preferably having a different index of refraction from the shell proper, which functions to vary the light-reflecting characteristics of the enamel. For instance, during the manufacture of the shell a very thin film of a very wet whitish ceramic paste may be coated over the outer surface of the shell after the latter has been moulded and before it is fired, or this coating may be applied to the inner surface of the mould. For best results uniformity in thickness of this film is purposely avoided so that the refraction effects due to this thin film overlying the enamel layer vary from point to point. On the other hand, if desired this film may be thickened substantially at certain points so as to provide an appreciable degree of opacity.

In dentures of usual prior construction the forward portion of the support is of substantial thickness in order to accommodate the rearwardly directed ends of the tooth retaining pins and to embed and conceal such ends. This unduly adds to the weight of the denture, and makes it difficult to obtain a natural tooth-crown lingual surface. In fact, dentures so made usually do not have a natural lingual conformation. On the other hand, according to the present invention, that part of the support to which the tooth is attached need be but little, if any, thicker than the palatal portion 3 of the support, and the lingual surface of the tooth and adjacent portion of the support may be made closely to simulate a natural tooth and the adjacent portion of the mouth tissue.

By the procedure hereinabove outlined a very firm and reliable anchorage of the tooth to the support is obtained such as to avoid all substantial possibility that the tooth will ever be dislodged from its support during use. Moreover the ceramic shell, which may be quite thin at certain points, receives an effective backing from the dentine-simulating body portion which is usually of an organic material and less brittle than the shell or crown so that the crown receives from this underlying backing more or less cushioning action. This helps to support the shell in resisting shocks and pressures received during use, and thus prolongs the life of the tooth.

Obviously, by the employment of plastic material of different and appropriate colors in the various parts of the support, the dentine-simulating plug or core, and in the cement used, a very wide range of effects is made available.

While certain desirable embodiments of the invention have been illustrated by way of example, it is to be understood that the invention is not limited to these precise embodiments but is to be regarded as broadly inclusive of any and all equivalent constructions as well as substitutions of materials and changes in proportions of parts, such as fall within the scope of the appended claims.

We claim:

1. As an article of manufacture and sale, a composite artificial tooth complete and ready for association with a support to form a denture, said tooth comprising a shell of hard wear-resistant material having an incisal portion and enamel-simulating walls which define an interior chamber, a plug of relatively softer dentine simulating material filling said chamber, and cement uniting the plug and shell, the gingival surface of said plug being exposed and downwardly concave for direct molecular union with the support.

2. As an article of manufacture and sale, a composite artificial tooth ready for use and comprising an enamel-simulating hollow shell having an incisal portion and labial and lingual walls defining an interior chamber, and a dentine-simulating, plug of organic material, which is normally hard but softer than the shell, filling the chamber in the latter, the gingival surface of said plug being exposed for direct molecular union with the support in forming a denture.

3. As an article of manufacture, a composite artificial tooth ready for mounting in an oral support, said tooth comprising a biting portion, and a body portion which constitutes the core of the tooth, and which in contour, location and relative dimensions simulates the dentine of a natural tooth, the upper end of said body portion being exposed to constitute the major part, at least, of the gingival surface of the tooth, said body portion being of a normally hard, organic material, relatively resilient as compared with the biting portion and of such a nature that when the exposed upper end of the body portion is contacted with a complemental surface of a support of similar material the tooth and support may be directly and cohesively joined.

4. An artificial tooth separate from and independent of a denture plate, said tooth comprising a relatively opaque dentine-simulating body portion constituting the interior of the tooth and which imparts its characteristic color to the tooth, and a biting portion of a relatively transparent material designed to resist wear, the body portion being normally hard but relatively resilient as compared with the biting portion, the gingival end of the tooth being adapted, constructed and arranged for direct molecular union with the substance of a denture plate.

5. An artificial tooth as an article of manufacture designed for ultimate joinder with a support, said tooth, prior to joinder with the support, comprising a body portion which constitutes the major part of the tooth and which in contour, location, relative dimensions and color effect closely simulates the dentine of the natural tooth, the body portion being exposed at and constituting the major part of the gingival end of the tooth, the material of the body portion being normally hard but such as to form a direct molecular union with a support of similar material when subjected to heat and pressure.

6. An artificial tooth as an article of manufacture designed for ultimate joinder with an oral support, said tooth, prior to joinder with the support, comprising a solid core portion simulating in location and contour the dentine of a natural tooth, the tooth also comprising an outer portion including the incisal edge, said outer portion being of ceramic material and the core portion being of synthetic resin, the major portion of the gingival end of the tooth being constituted by the exposed upper surface of the core portion, said exposed surface being designed for molecular union with the surface of an oral support of compatible material.

7. An artificial tooth as a completed article of manufacture, free and independent of other structures and comprising as material elements a preformed mass of relatively opaque organic material which is hard at normal temperatures and which in color, shape and location simulates the dentine of the corresponding part of a natural tooth and which thus constitutes the major portion of the tooth, and a relatively transparent enamel-simulating portion which provides the biting surface and which is harder than the dentine-simulating mass, the dentine-simulating mass being exposed at the gingival end of the tooth and being capable, by appropriate treatment, of molecularly uniting with plate-forming material.

8. An artificial tooth as a completed article of manufacture, free and independent of other structures and comprising an enamel-simulating portion and a normally hard dentine-simulating portion, the latter being a permanent element of and constituting the major part of the tooth, the tooth having within its own proper structure, as finished by the tooth manufacturer, coloring material which determines its individual shade, said coloring material being incorporated in the dentine-simulating portion of the tooth, the enamel-simulating portion being harder and more wear-resistant than the dentine-simulating portion, the material which constitutes the major portion of the gingival end of the tooth being normally hard, but capable, by proper treatment, of molecularly uniting with plate-forming material.

9. An artificial tooth as a completed article of manufacture, independent of other structures and comprising as essential elements a normally hard mass of synthetic resin which in color, shape, and location simulates the dentine of a natural tooth and which constitutes the major part of the artificial tooth, and an enamel-simulating portion which provides the biting surface, the enamel-simulating portion being of thermoplastic material, harder than the dentine-simulating portion and permanently united to the latter, the material constituting the major portion at least of the gingival end of the tooth being capable, by appropriate treatment, of molecularly uniting with plate-forming material, the enamel-simulating portion being of such transparency that the color of the dentine-simulating mass determines the shade of the tooth.

SIMON MYERSON.
MARTIN MYERSON.

REFERENCES CITED

The following references are of record in the file of this patent:

UNITED STATES PATENTS

| Number | Name | Date |
| --- | --- | --- |
| 1,743,873 | Taslove | Jan. 14, 1930 |
| 178,143 | Hall | May 30, 1876 |
| 1,699,854 | Myerson | Jan. 22, 1929 |
| 1,712,043 | Limbarth | May 7, 1929 |
| 2,163,014 | Voigt | June 20, 1939 |
| 2,230,164 | Myerson | Jan. 28, 1941 |
| 2,202,712 | Myerson | May 28, 1940 |
| 1,384,282 | Tuttle | July 12, 1921 |
| 638,019 | Justi | Nov. 28, 1897 |
| 696,099 | Hollingsworth | Mar. 25, 1902 |
| 333,782 | Register | Jan. 5, 1886 |
| 589,383 | Dennett | Aug. 31, 1897 |
| 2,013,295 | Tidd | Sept. 3, 1935 |

FOREIGN PATENTS

| Number | Country | Date |
| --- | --- | --- |
| 470,444 | British | Aug. 16, 1937 |
| 110,824 | British | Dec. 4, 1916 |
| 505,063 | British | May 4, 1939 |

OTHER REFERENCES

"Prosthetic Dentistry," J. H. Prothero, 3rd edition (1923), pp. 426, 535, 537.